(12) United States Patent
George

(10) Patent No.: US 12,292,002 B2
(45) Date of Patent: May 6, 2025

(54) CASING ASSEMBLY

(71) Applicant: Rolls-Royce plc, London (GB)

(72) Inventor: Marcus J. George, London (GB)

(73) Assignee: ROLLS-ROYCE PLC, London (GB)

( * ) Notice: Subject to any disclaimer, the term of this patent is extended or adjusted under 35 U.S.C. 154(b) by 856 days.

(21) Appl. No.: 17/040,185

(22) PCT Filed: Mar. 19, 2019

(86) PCT No.: PCT/EP2019/056794
§ 371 (c)(1),
(2) Date: Sep. 22, 2020

(87) PCT Pub. No.: WO2019/179993
PCT Pub. Date: Sep. 26, 2019

(65) Prior Publication Data
US 2021/0010425 A1    Jan. 14, 2021

(30) Foreign Application Priority Data
Mar. 22, 2018  (GB) ..................................... 1804569

(51) Int. Cl.
*F02C 7/25* (2006.01)
*A62C 2/06* (2006.01)
(Continued)

(52) U.S. Cl.
CPC ................ *F02C 7/25* (2013.01); *A62C 2/065* (2013.01); *A62C 2/247* (2013.01); *F01D 25/24* (2013.01); *F05D 2240/14* (2013.01)

(58) Field of Classification Search
CPC . F02C 7/25; F01D 25/24; A62C 2/247; A62C 2/065; A62C 3/08; F05D 2240/14
See application file for complete search history.

(56) References Cited

U.S. PATENT DOCUMENTS

| | | | |
|---|---|---|---|
| 4,114,369 | A | 9/1978 | Crowley |
| 2005/0076504 | A1 | 4/2005 | A. Morrison et al. |

(Continued)

FOREIGN PATENT DOCUMENTS

| | | |
|---|---|---|
| CN | 103124008 A | 5/2013 |
| DE | 4102330 A1 | 8/1992 |

(Continued)

OTHER PUBLICATIONS

Sep. 18, 2018—(GB) Search Report—App. No. 1804569.0.

(Continued)

*Primary Examiner* — Steven M Cernoch
(74) *Attorney, Agent, or Firm* — Banner & Witcoff, Ltd.

(57) ABSTRACT

There is provided a casing assembly for a gas turbine engine comprising: a casing and electrically conductive intumescent material extending around the casing. The intumescent material is being activatable in response to electrical current to expand. The casing assembly comprises an electrical activation line extending around the casing to activate the intumescent material. The activation line extends in a pattern such that an activation area which circumscribes the activation line has an axial extent of at least 50% of the casing and a circumferential extent of at least 50%, to thereby activate the intumescent material at multiple locations over a corresponding area of the casing.

19 Claims, 6 Drawing Sheets

(51) Int. Cl.
*A62C 2/24* (2006.01)
*F01D 25/24* (2006.01)

(56) References Cited

U.S. PATENT DOCUMENTS

| | | | |
|---|---|---|---|
| 2008/0141644 | A1 | 6/2008 | Schlichting et al. |
| 2011/0042515 | A1 | 2/2011 | Schoke et al. |
| 2012/0227370 | A1 | 9/2012 | Mickelsen et al. |
| 2015/0342022 | A1* | 11/2015 | Willmot .................. H05K 3/10 |
| | | | 174/250 |
| 2018/0073436 | A1 | 3/2018 | Kubisch et al. |

FOREIGN PATENT DOCUMENTS

| | | |
|---|---|---|
| EP | 2017072 A1 | 1/2009 |
| EP | 2759318 A2 | 7/2014 |
| EP | 3091196 A1 | 11/2016 |
| EP | 3293000 A1 | 3/2018 |
| GB | 2120580 A | 12/1983 |
| JP | 2017-504755 A | 2/2017 |
| WO | 9948837 A1 | 9/1999 |
| WO | 2010/109158 A1 | 9/2010 |

OTHER PUBLICATIONS

Jun. 6, 2019—(WO) International Search Report & Written Opinion—PCT/EP2019/056794.
Oct. 25, 2022—(JP) Office Action—App 2020-544892 (with trans).
May 30, 2022—(CN) Office Action—App 201980020852.8—with Eng trans.

* cited by examiner

CASING ASSEMBLY

CROSS-REFERENCE TO RELATED APPLICATIONS

This application is a U.S. National Stage application under 35 U.S.C. § 371 of International Application PCT/EP2019/056794, filed Mar. 19, 2019, which claims the benefit of priority to United Kingdom Application No. GB 1804569.0, filed Mar. 22, 2018, and the present application claims the benefit of the filing date of both of these prior applications, which are incorporated by reference in their entireties.

TECHNICAL FIELD

The invention relates to a casing assembly for a gas turbine engine.

BACKGROUND

Intumescent materials are used for insulating parts against fire to minimise damage to the parts. Typically, an intumescent material will expand many times its original size when heated to a predetermined temperature. However, this may require exposure to a temperature as high as 190 degrees Celsius. Such temperatures may indicate that a fire has already started and may be damaging components which are to be protected, before the intumescent material begins to expand.

SUMMARY

According to an aspect, there is provided a casing assembly for a gas turbine engine comprising: a casing; electrically conductive intumescent material extending around the casing, the intumescent material being activatable in response to electrical current to expand; an electrical activation line extending around the casing to activate the intumescent material, the activation line extending in a pattern such that an activation area which circumscribes the activation line has an axial extent of at least 50% of the casing and a circumferential extent of at least 50%, to thereby activate the intumescent material at multiple locations over a corresponding area of the casing.

The activation line may extend in a helical pattern. The activation line may comprise a plurality of line portions arranged in side by side relationship. The line portions may be joined in series by connecting turns of the activation line. The line portions may be electrically coupled in parallel relationship. The activation line may comprise two lines of opposing polarity in side by side relationship.

The activation line may be coupled to an activation control system comprising a temperature sensor and a controller configured to selectively direct electric current through the activation line when an output of the temperature sensor is indicative of a fire or excessive heat event.

A layer of resin may surround the intumescent material and electrical activation line. The resin layer may comprise frangible portions. The resin layer may preferentially break at the frangible portions to permit expansion of the intumescent material.

The invention may comprise any combination of the features and/or limitations referred to herein, except such features as are mutually exclusive.

BRIEF DESCRIPTION OF THE DRAWINGS

Embodiments of the invention will now be described, by way of example, with reference to the accompanying drawings, in which.

DETAILED DESCRIPTION

Figure 1:
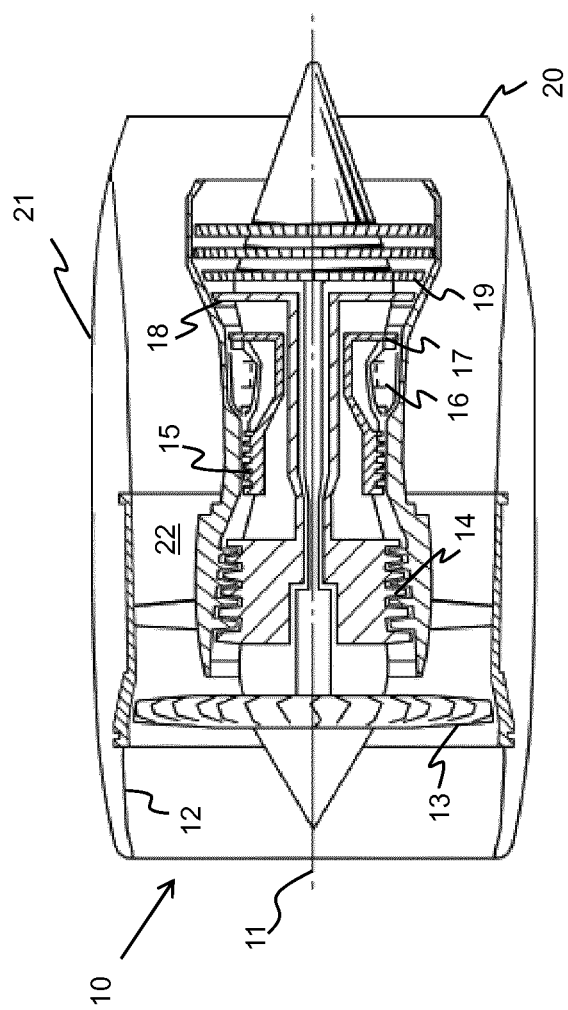
FIG. 1 schematically shows a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
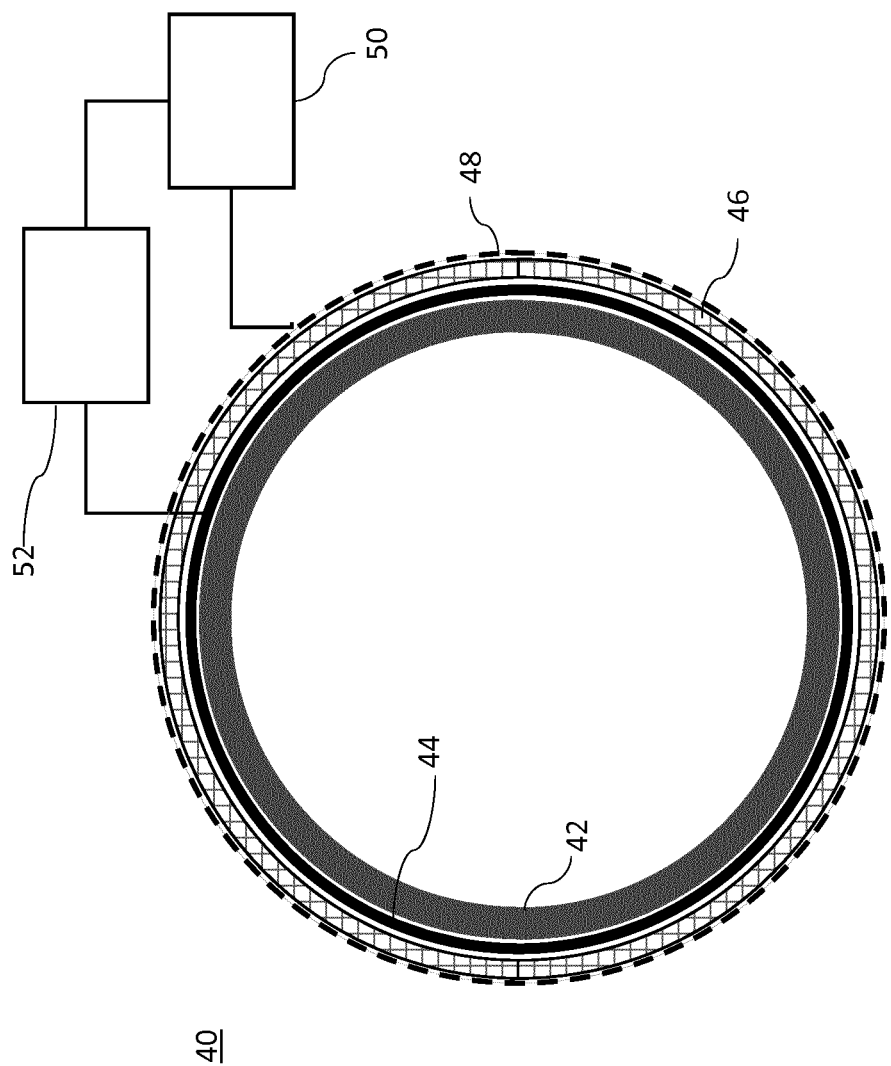
FIG. 2 schematically shows a cross-sectional view of a first example casing assembly with an electrical activation line and intumescent material.

FIG. 2 shows a cross-sectional view of a first example casing assembly 40 for a gas turbine engine. It comprises a casing 42, an electrical activation line 44 and an intumescent material 46. The casing assembly 40 comprises an activation control system having a temperature sensor 50 and a controller 52. The controller 52 is configured to selectively direct electric current through the electrical activation line 44 when an output of the temperature sensor 50 is indicative of a fire or excessive heat event.

The casing 42 is a composite casing having an annular cross-sectional profile extending in an axial direction, and which surrounds components of a gas turbine engine. The electrical activation line 44 extends around the outer surface of the casing 42 and along an axial extent of the casing 42. In this example, the electrical activation line 44 surrounds the whole circumference of the casing 42. However, in other examples, the electrical activation line may extend around only a portion of the casing 42.

The intumescent material 46 is flexible and extends around the casing 42 and around the electrical activation line 44. The intumescent material 46 is electrically conductive and is activated to expand in response to an electrical current. For example, the intumescent material may be a fibrous material comprising an intumescent substance such as thermally expandable graphite and an electrically conductive material.

The intumescent material 46 is coated with a protective layer of resin 48 which protects the intumescent material 46 from damage. The protective resin layer 48 may include frangible portions between adjacent sections so that the resin layer 48 preferentially breaks at the frangible portions to permit expansion of the intumescent material 46.

During use, the temperature sensor 50 monitors the temperature at the intumescent material 46 and determines whether the temperature exceeds a threshold corresponding to a fire or excessive heat event. When the temperature sensor determines that the temperature exceeds the threshold, the controller directs current to flow through the electrical activation line 44 to cause expansion of the intumescent material 46. The threshold temperature is lower than the ambient temperature at which the intumescent material would normally expand. This ensures that the intumescent material expands at a lower temperature than it would normally be activated at, or in response to high temperature at a sensing location remote from the intumescent material, and can therefore protect components from excessive temperatures or fire more effectively.

Figure 3:
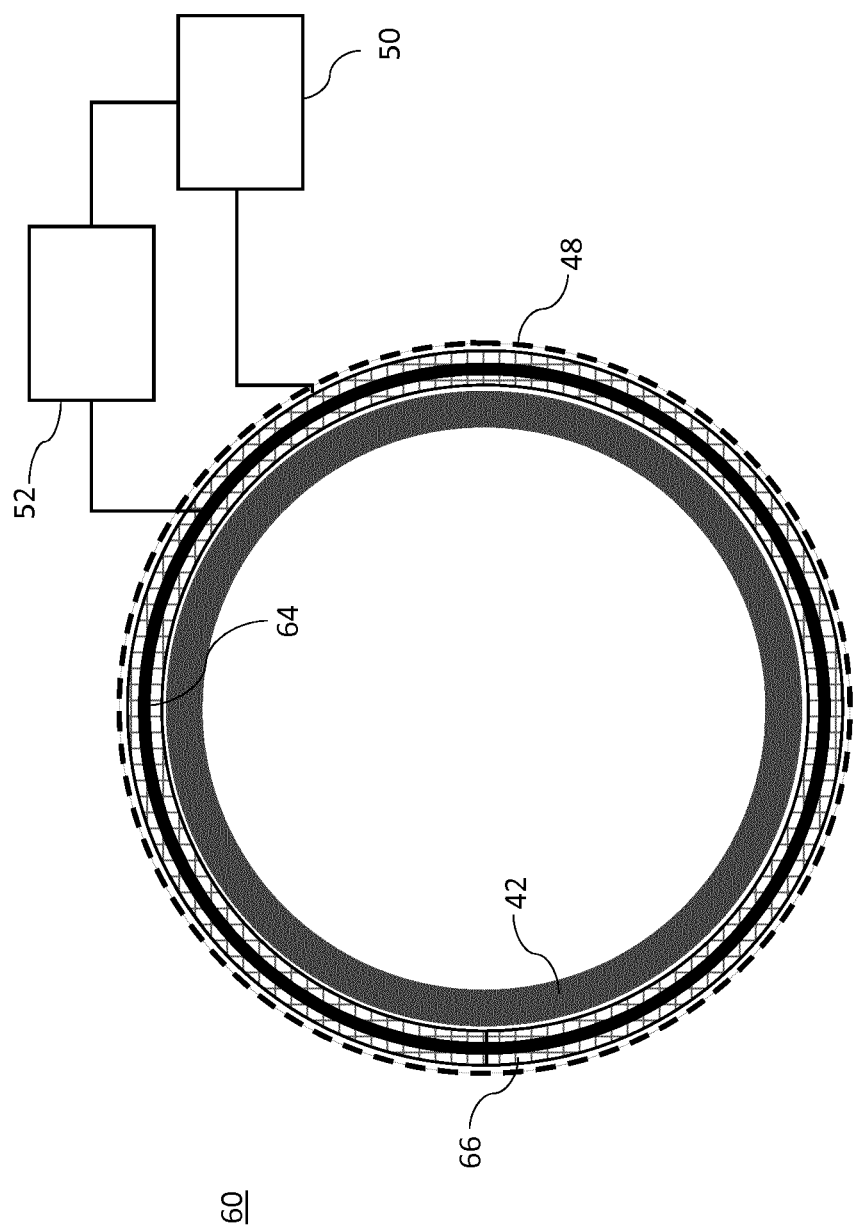
FIG. 3 schematically shows a cross-sectional view of a second example casing assembly with an electrical activation line embedded in an intumescent material.

FIG. 3 shows a cross-sectional view of a second example casing assembly 60 having a casing 42 as described with reference to FIG. 2, and an electrically conductive and flexible intumescent material 66 which extends around the casing 42. An electrical activation line 64 is embedded within the intumescent material 66. In other examples, an electrical activation line may be sandwiched between two layers of intumescent material which extend around the casing.

The casing assembly 60 comprises the activation control system of FIG. 2, having the temperature sensor 50 and the controller 52 where the controller 52 is configured to selectively direct electric current through the electrical activation line 64 when an output of the temperature sensor 50 is indicative of a fire or excessive heat event.

The intumescent material 66 is coated with the protective resin layer 48 as described with reference to FIG. 2. The protective resin layer 48 is disposed on an opposing side of the intumescent material 66 to the casing 42 (i.e. the side of the intumescent material 66 furthest from the casing 42).

Although it has been described with reference to FIGS. 2 and 3 that the intumescent material extends around the whole circumferential extent of the casing, in other examples, the intumescent material may only be disposed around a portion of the circumferential extent of the casing, for example at least 50%. In such examples, the electrical activation line may extend around the casing by a similar amount to correspond with the intumescent material.

In the following description, the term "axial" is used to mean in a direction parallel to a central axis of the casing 42. The term "circumferential" is used to mean around the circumference of the casing 42 in a plane which is perpendicular to the axis of the casing 42.

Figure 4:
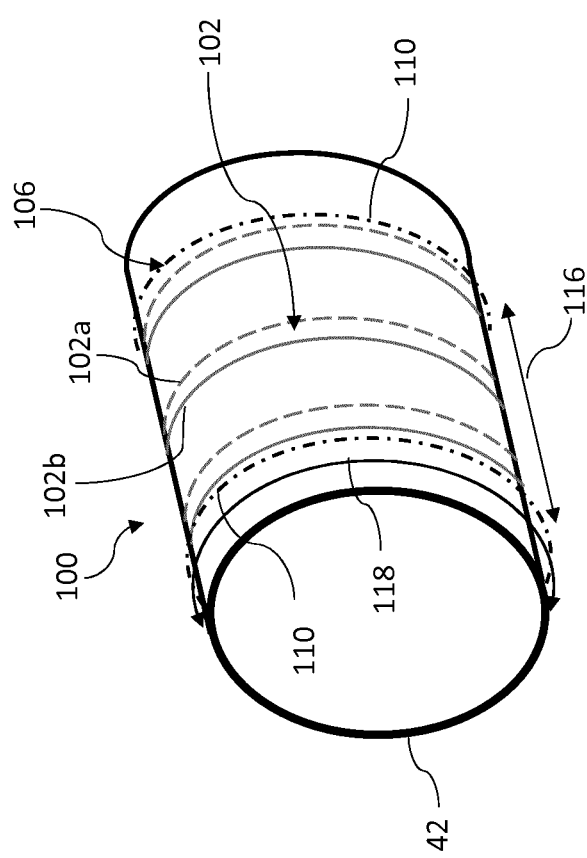
FIG. 4 schematically shows a perspective view of a first example electrical activation line around a casing.

FIG. 4 shows a perspective view of a first example electrical activation line 100 disposed around a casing 42. In this example, the electrical activation line 100 is disposed around the casing 42 in a manner as described with reference to FIG. 2, so that intumescent material may be laid over the electrical activation line 100. However, in other examples, the electrical activation line may be disposed around the casing in the manner described with reference to FIG. 3.

The electrical activation line 100 comprises a plurality of line portions 102 which extend around the casing 42 in a pattern. In this example, there are three line portions 102 each of which extend in a circumferential direction around the whole circumferential extent of the casing 42. In other examples, there may be more than three or fewer than three line portions disposed around the casing.

The electrical activation line 100 defines a circumscribed area 106 of the casing 42 which circumscribes the electrical activation line 100. In other words, the area 106 is defined by two axial boundaries drawn on the casing 42 which touch but do not cross the electrical activation line 100 and two circumferential boundaries which touch but do not cross the electrical activation line 100, to form a developed area around the casing (e.g. in the form of a rectangle which is draped around the casing 42).

In this example, the circumscribed area 106 is defined by two circumferential boundaries 110 which extend around the whole circumference of the casing. The area 106 has an axial extent 116 of approximately 60% i.e. the area 106 covers approximately 60% of the axial extent of the casing 42. The area 106 has a circumferential extent 118 of 100% i.e. the area 106 covers 100% of the circumferential extent of the casing 42, such that in this example there are no axial boundaries. However, in other examples, the circumscribed area of the electrical activation line may have an axial extent of more than 60% or less than 60%, and/or a circumferential extent of less than 100%.

In yet other examples, the electrical activation line preferably has axial extent of anything above 50% and a circumferential extent of anything above 50% so that the majority of the area of the casing which will be covered by intumescent material, is covered by the electrical activation line.

The line portions 102 are distributed equally along the axial extent of the area 106. The line portions 102 are electrically coupled to one another in parallel relationship.

Each of the line portions 102 comprises two lines of opposing polarity in side by side relationship. Therefore each line portion 102 comprises a positive line 102*a* and a negative line 102*b* which are spaced apart from one another, and are disposed side by side.

In use, the example electrical activation line 100 forms part of a casing assembly 40, 60 as described with reference to FIGS. 2 and 3. If the temperature sensor 50 determines that the temperature is indicative of a fire or excessive heat event, the controller 52 will direct electrical current to flow in the electrical activation line 100 to activate intumescent material which is electrically coupled to the electrical activation line 100. The activation line 100 has an area 106 which covers the majority of the casing 42 and so will activate a large portion of the intumescent material simultaneously to minimise damage to components all around the casing.

Although it has been described that the electrical activation line portions in FIG. 4 are connected in parallel relationship, in other examples, the line portions may be connected in series relationship by connecting turns as described with reference to FIG. 6 below.

Figure 5:
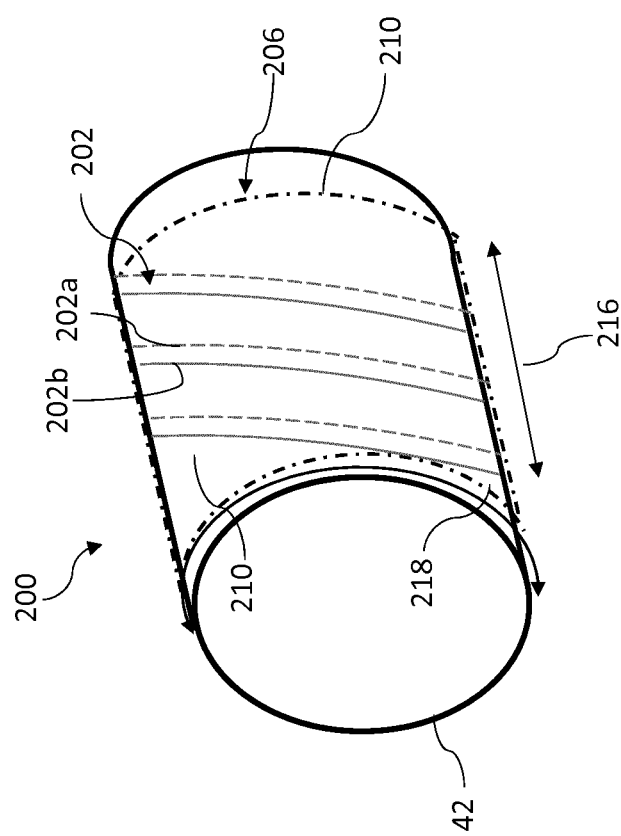
FIG. 5 schematically shows a perspective view of a second example electrical activation line around a casing.

FIG. 5 shows a perspective view of a second example activation line 200 disposed around a casing 42. In this example, the activation line 200 is wound around the casing 42 in a helical pattern along the axial direction of the casing 42.

The electrical activation line 200 covers a circumscribed area 206, defined by two circumferential boundaries 210. The area has an axial extent 216 of approximately 80% and a circumferential extent 218 of 100%. However, in other examples, the electrical activation line may have an axial extent of less than 80% or more than 80%, and/or a circumferential extent of less than 100%.

Each of the line portions 202 of the electrical activation line 200 comprises two lines of opposite polarity; a positive line 202a and a negative line 202b, which are spaced apart from one another, and are disposed side by side.

Figure 6:
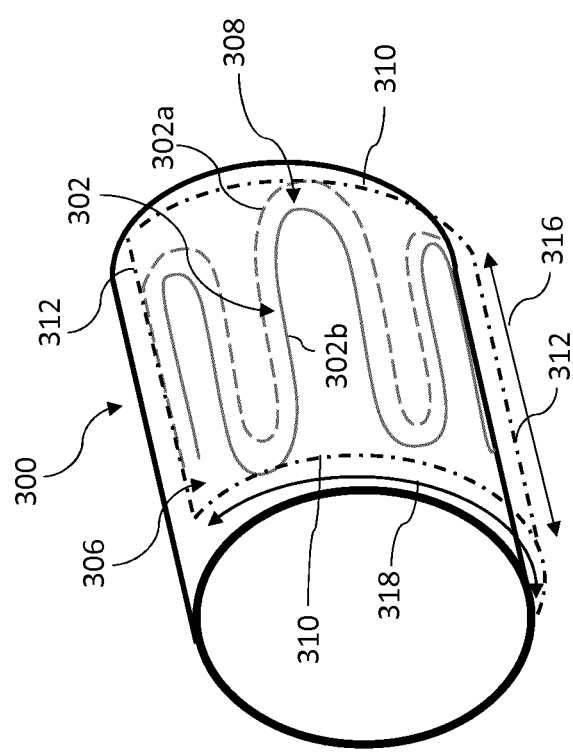
FIG. 6 schematically shows a perspective view of a third example electrical activation line around a casing.

FIG. 6 shows a perspective view of a third example electrical activation line 300 disposed around a casing 42. In this example, the electrical activation line 300 comprises a plurality of line portions 302 which extend in an axial direction along the casing 42. The line portions 302 are connected together in series by connecting turns 308.

The electrical activation line 300 defines a circumscribed area 306, delimited by two circumferential boundaries 310, and two axial boundaries 312 which circumscribe the electrical activation line 300. The area 310 has an axial extent 316 of approximately 90% and a circumferential extent 318 of approximately 50%.

In this example, there are six line portions 302 which are equally distributed around the circumferential extent of the area 306. Each adjacent pair of line portions 302 is connected by a connecting turn 308, where connecting turns around the circumference of the casing 42 are disposed on alternating axial sides of the casing 42, such that each of the line portions 302 are connected in series, in a zig-zag shape.

In other examples, the electrical activation line 300 may have an axial extent of more than 90% or less than 90%. In yet other examples, the electrical activation line 300 may have a circumferential extent of more than 50% or less than 50%. Preferably, the area 306 has an axial extent and a circumferential extent of more than 50%.

Each of the line portions 302 of the electrical activation line 300 comprises two lines of opposing polarity in side by side relationship. Therefore each line portion 302 comprises a positive line 302a and a negative line 302b which are spaced apart from one another, and are disposed side by side.

Although it has been described that the electrical activation line portions in FIG. 6 are connected in series relationship, in other examples, the line portions may be connected in parallel relationship as described with reference to FIG. 4 above.

The electrical activation lines 100, 200 and 300 described with reference to FIGS. 4, 5 and 6 are examples of suitable electrical activation lines which cover an area of the casing 42 having an axial extent of at least 50% and a circumferential extent of at least 50%. This ensures that, if the temperature sensor of the control system determines temperatures indicative of a fire or excessive heat event, the majority of the intumescent material can be instantly and simultaneously activated by applying an electrical current to the electrical activation line.

Although it has been described that the intumescent material is coated with a protective resin layer, in some examples, there may be no protective resin layer.

The invention claimed is:

1. A casing assembly for a gas turbine engine comprising:
a casing having a circular annular cross-sectional profile extending in an axial direction and configured for surrounding components of the gas turbine engine;
electrically conductive intumescent material extending around the casing, the intumescent material being activatable in response to electrical current to expand; and
an electrical activation line extending around the casing to activate the intumescent material, the activation line extending in a pattern such that an activation area which circumscribes the activation line has an axial extent of at least 50% of an axial length of the casing and a circumferential extent of at least 50% of a circumference of an outer surface of the circular annular cross-sectional profile,
wherein the electrical activation line comprises two activation lines in a side by side relationship, the two activation lines being electrically coupled to each other via the electrically conductive intumescent material to thereby activate the intumescent material at multiple locations over a corresponding area of the casing.

2. A casing assembly according to claim 1, wherein the activation line extends in a helical pattern.

3. A casing assembly according to claim 1, wherein each of the two activation lines comprises a plurality of line portions arranged in side by side relationship.

4. A casing assembly according to claim 3, wherein for each of the two activation lines, the respective line portions are joined in series by connecting turns of the activation line.

5. A casing assembly according to claim 3, wherein the line portions are electrically coupled in parallel relationship.

6. A casing assembly according to claim 1, wherein the activation line is coupled to an activation control system comprising a temperature sensor and a controller configured to selectively direct electric current through the activation line when an output of the temperature sensor is indicative of a fire or excessive heat event.

7. The casing assembly of claim 6, wherein the controller is configured to selectively pass a current through the electrically conductive intumescent material via the two activation lines.

8. A casing assembly according to claim 1, wherein a layer of resin surrounds the intumescent material and the electrical activation line.

9. A casing assembly according to claim 8, wherein the resin layer comprises frangible portions.

10. The casing assembly of claim 1, wherein the two activation lines are of opposing polarity, further comprising a controller configured to selectively direct current in the two activation lines.

11. The casing assembly of claim 1, wherein the two activation lines are arranged to pass a current through the electrically conductive intumescent material.

12. A casing assembly for a gas turbine engine comprising:
a casing having a circular annular cross-sectional profile extending in an axial direction and configured for surrounding components of the gas turbine engine;
electrically conductive intumescent material extending around the casing, the intumescent material being activatable in response to electrical current to expand; and
an electrical activation line extending around the casing and electrically coupled to the electrically conductive intumescent material to activate the intumescent material, the activation line extending in a pattern such that an activation area which circumscribes the activation line has an axial extent of at least 50% of an axial length of the casing and a circumferential extent of at least 50% of a circumference of an outer surface of the circular annular cross-sectional profile, to thereby activate the intumescent material at multiple locations over a corresponding area of the casing;

wherein the activation line comprises two lines of opposing polarity in side by side relationship.

13. A casing assembly according to claim 12, wherein the activation line extends in a helical pattern.

14. A casing assembly according to claim 12, wherein each of the two lines comprises a plurality of line portions arranged in side by side relationship.

15. A casing assembly according to claim 14, wherein for each of the two lines, the respective line portions are joined in series by connecting turns of the activation line.

16. A casing assembly according to claim 14, wherein the line portions are electrically coupled in parallel relationship.

17. A gas turbine engine comprising:
a casing having a circular annular cross-sectional profile extending in an axial direction and configured for surrounding components of the gas turbine engine;
electrically conductive intumescent material extending around the casing, the intumescent material being activatable in response to electrical current to expand; and
an electrical activation line extending around the casing and electrically coupled to the electrically conductive intumescent material to activate the intumescent material, the activation line extending in a pattern such that an activation area which circumscribes the activation line has an axial extent of at least 50% of an axial length of the casing and a circumferential extent of at least 50% of a circumference of an outer surface of the circular annular cross-sectional profile, to thereby activate the intumescent material at multiple locations over a corresponding area of the casing.

18. The gas turbine engine of claim 17, wherein the activation line comprises two activation lines of opposing polarity in side by side relationship, and wherein the gas turbine engine comprises a controller configured to selectively direct current in the two activation lines.

19. The gas turbine engine of claim 18, wherein each of the two activation lines comprises a plurality of line portions arranged in side by side relationship, the line portions joined by connecting turns of the respective activation lines.

* * * * *